US010142852B2

United States Patent
Wong et al.

(10) Patent No.: US 10,142,852 B2
(45) Date of Patent: Nov. 27, 2018

(54) WARNING OF SPECTRUM ACCESS REVOCATION

(71) Applicant: NOKIA SOLUTIONS AND NETWORKS OY, Espoo (FI)

(72) Inventors: Curt Wong, Bellevue, WA (US); Ruth Gayde, Naperville, IL (US); Tarun Agarwal, Palatine, IL (US); Alex Hirsbrunner, Bloomingdale, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/479,449

(22) Filed: Apr. 5, 2017

(65) Prior Publication Data
US 2018/0295522 A1 Oct. 11, 2018

(51) Int. Cl.
*H04W 16/14* (2009.01)
*H04W 4/90* (2018.01)

(52) U.S. Cl.
CPC ............. *H04W 16/14* (2013.01); *H04W 4/90* (2018.02)

(58) Field of Classification Search
CPC .......... H04W 16/14; H04W 4/22; H04W 4/90
See application file for complete search history.

(56) References Cited

U.S. PATENT DOCUMENTS

| 2013/0188607 | A1* | 7/2013 | Mutikainen | H04W 4/90 370/331 |
| 2014/0018031 | A1* | 1/2014 | Ode | H04W 4/22 455/404.1 |

OTHER PUBLICATIONS

3GPP TS 23.167 V14.3.0 (Mar. 2017); 3rd Generation Partnership Project; Technical Specification Group Services and System Aspects; IP Multimedia Subsystem (IMS) emergency sessions (Release 14).
3GPP TS 23.401 V14.3.0 (Mar. 2017); 3rd Generation Partnership Project; Technical Specification Group Services and System Aspects; General Packet Radio Service (GPRS) enhancements for Evolved Universal Terrestrial Radio Access Network (E-UTRAN) access (Release 14).
International Search Report and Written Opinion application No. PCT/EP2018/058565 dated May 23, 2018.

* cited by examiner

*Primary Examiner* — Joseph Dean, Jr.
(74) *Attorney, Agent, or Firm* — Squire Patton Boggs (US) LLP (57) ABSTRACT

Various communication systems may benefit from improved signaling. For example, certain communication systems may benefit from improved signaling before network access is revoked through a citizens broadband radio service. A method may include receiving at a network entity from a citizens broadband radio service device a warning message. The warning message may include a drop time after which communication between a network and a user equipment using the citizens broadband radio service will terminate. The method may also include triggering the performing of an action based on the warning message by the network before the drop time.

22 Claims, 4 Drawing Sheets

WARNING OF SPECTRUM ACCESS REVOCATION

BACKGROUND

Field

Various communication systems may benefit from improved signaling to a network when recognizing an imminent occurrence of an event. For example, certain communication systems may benefit from improved signaling to the network before network access is revoked through a citizens broadband radio service.

Description of the Related Art

The Federal Communications Commission (FCC), which is an independent government agency of the United States government, has adopted rules to allow for shared commercial use of 150 megahertz (MHz) of spectrum in a band ranging from 3550-3700 MHz. In certain embodiments, such a band is known as the 3.5 GHz band. The 3.5 GHz unlicensed spectrum can be made available to a wide variety of users and services, such as voice communications in Third Generation Partnership Project (3GPP) technology, such as Long Term Evolution (LTE) or LTE Advanced (LTE-A). To deal with the 3.5 GHz unlicensed spectrum, a three-tiered commercial radio service called a Citizens Broadband Radio Service (CBRS) has been developed.

In the three-tiered system of the CBRS, the spectrum usage is shared between incumbent licensees, priority access (PA) licensees, and general authorized access (GAA) operators. Commercial telecommunication service providers using the CBRS are designated as GAA operators. GAA operators have no interference protection from either PA licensees or incumbent licensees with which the GAA operators share the 3.5 GHz spectrum. On the other hand, GAA operators are not allowed to create interference for PA licensees or incumbent licensees.

In order to facilitate the spectrum sharing process of the 3.5 GHz band, a Spectrum Access System (SAS) is used to assign frequencies. SAS is a highly automated frequency coordinator that authorizes and manages use of the CRBS spectrum. The SAS both protects higher tier operations, such as PA licensees or incumbent licensees, from interference, and maximizes frequency capacity for all CBRS operators.

SUMMARY

According to certain embodiments, an apparatus may include at least one memory including computer program code, and at least one processor. The at least one memory and the computer program code may be configured, with the at least one processor, to cause the apparatus at least to receive at a network entity from a citizens broadband radio service device a warning message. The warning message may include a drop time after which communication between a network and a user equipment using the citizens broadband radio service will terminate. The at least one memory and the computer program code may also be configured, with the at least one processor, to cause the apparatus at least to trigger the performing of an action based on the warning message by the network before the drop time.

A method, in certain embodiments, may include receiving at a network entity from a citizens broadband radio service device a warning message. The warning message may include a drop time after which communication between a network and a user equipment using the citizens broadband radio service will terminate. The method may also include triggering the performing of an action based on the warning message by the network before the drop time.

An apparatus, in certain embodiments, may include means for receiving at a network entity from a citizens broadband radio service device a warning message. The warning message may include a drop time after which communication between a network and a user equipment using the citizens broadband radio service will terminate. The apparatus may also include means for triggering the performing of an action based on the warning message by the network before the drop time.

According to certain embodiments, a non-transitory computer-readable medium encoding instructions that, when executed in hardware, perform a process. The process may include receiving at a network entity from a citizens broadband radio service device a warning message. The warning message may include a drop time after which communication between a network and a user equipment using the citizens broadband radio service will terminate. The process may also include triggering the performing of an action based on the warning message by the network before the drop time.

According to certain other embodiments, a computer program product may encode instructions for performing a process. The process may include receiving at a network entity from a citizens broadband radio service device a warning message. The warning message may include a drop time after which communication between a network and a user equipment using the citizens broadband radio service will terminate. The process may also include triggering the performing of an action based on the warning message by the network before the drop time.

According to certain embodiments, an apparatus may include at least one memory including computer program code, and at least one processor. The at least one memory and the computer program code may be configured, with the at least one processor, to cause the apparatus at least to receive at a citizens broadband radio service device a warning message. The warning message may include a drop time after which communication between a user equipment and a network via the citizens broadband radio service will terminate. The at least one memory and the computer program code may also be configured, with the at least one processor, to cause the apparatus at least to transmit the warning message from the citizens broadband radio service device to a network entity. The warning message may trigger an action by the network before the drop time based on the warning message A method, in certain embodiments, may include receiving at a citizens broadband radio service device a warning message. The warning message may include a drop time after which communication between a user equipment and a network via the citizens broadband radio service will terminate. The method may also include transmitting the warning message from the citizens broadband radio service device to a network entity. The warning message may trigger an action by the network before the drop time based on the warning message.

An apparatus, in certain embodiments, may include means for receiving at a citizens broadband radio service device a warning message. The warning message may include a drop time after which communication between a user equipment and a network via the citizens broadband radio service will terminate. The apparatus may also include means for transmitting the warning message from the citizens broadband radio service device to a network entity. The warning message may trigger an action by the network before the drop time based on the warning message.

According to certain embodiments, a non-transitory computer-readable medium encoding instructions that, when executed in hardware, perform a process. The process may include receiving at a citizens broadband radio service device a warning message. The warning message may include a drop time after which communication between a user equipment and a network via the citizens broadband radio service will terminate. The process may also include transmitting the warning message from the citizens broadband radio service device to a network entity. The warning message may trigger an action by the network before the drop time based on the warning message.

According to certain other embodiments, a computer program product may encode instructions for performing a process. The process may include receiving at a citizens broadband radio service device a warning message. The warning message may include a drop time after which communication between a user equipment and a network via the citizens broadband radio service will terminate. The process may also include transmitting the warning message from the citizens broadband radio service device to a network entity. The warning message may trigger an action by the network before the drop time based on the warning message.

BRIEF DESCRIPTION OF THE DRAWINGS

For proper understanding of the invention, reference should be made to the accompanying drawings, wherein.

DETAILED DESCRIPTION

Certain embodiments can allow a citizens broadband radio service device (CBSD) to warn the network that access to the CBRS will be terminated or revoked. Before the termination of access, a network entity, such as a proxy call session control function (P-CSCF) or a policy and charging rules function (PCRF), may trigger the performance of an action by the network. In embodiments that include an internet protocol multimedia subsystem (IMS) emergency session, the network may perform certain actions relating to the user equipment before access to the CBRS may be terminated.

Figure 1:
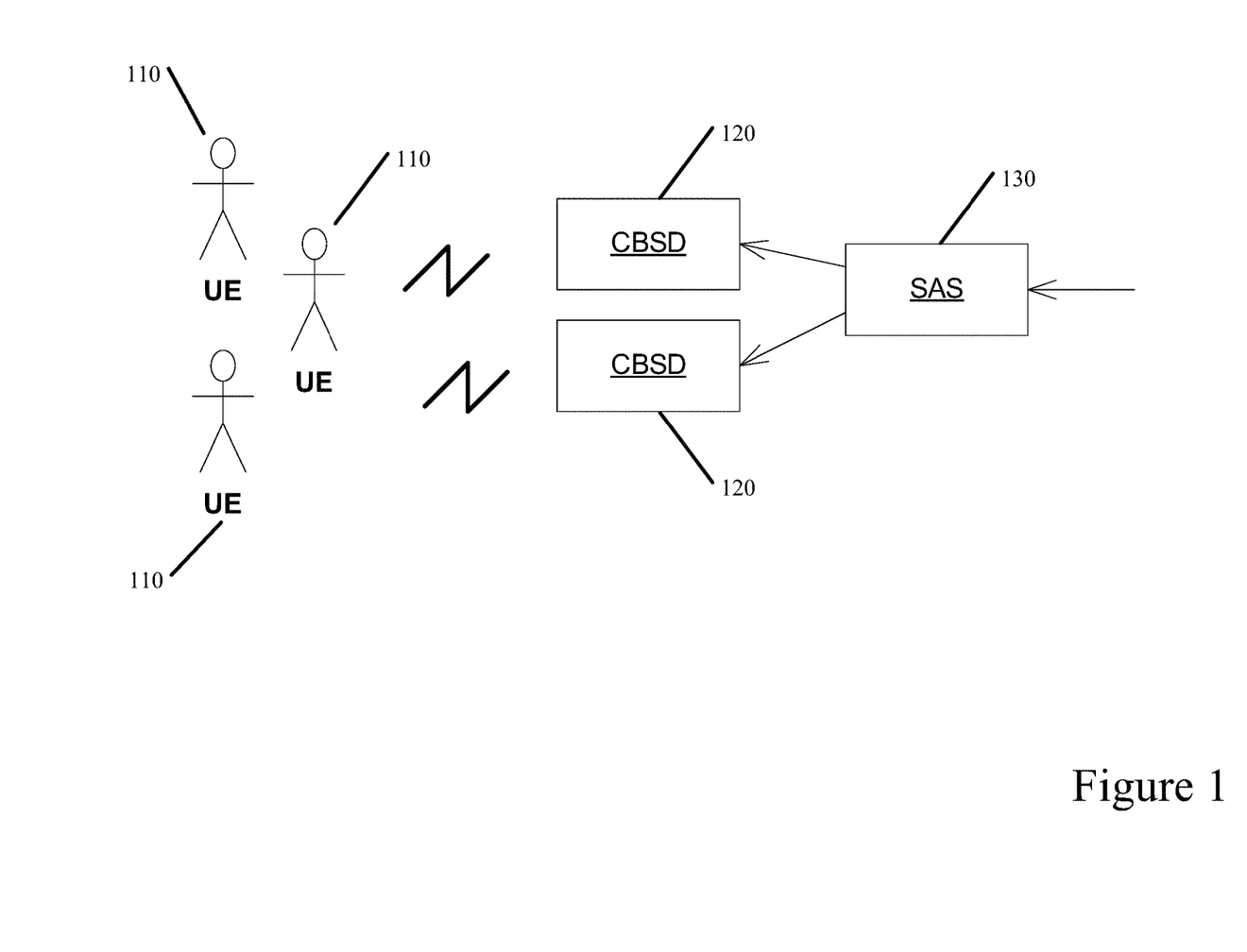
FIG. 1 illustrates an example of CBRS architecture.

FIG. 1 illustrates an example of CBRS architecture. In particular, the CBRS may include one or more user equipment (UE) 110, one or more CBSD 120, and one or more SAS 130. CSBD may be a fixed station or network of stations that may behave similar to an evolved NodeB (eNodeB) in LTE. CBSD 120 may have an interface, similar to a Uu interface in LTE, that connects CBSD 120 and UE 110, and an S1 interface that connects CBSD 120 and a mobility management entity (MME) in the core network. In some embodiments, CBSD 120 may also have an interface, for example an S 1-U, towards an evolved packet core (EPC). Further detail regarding the above interfaces may be found in 3GPP TS 23.401. 3GPP TS 23.401 is hereby incorporated by references in its entirety.

In certain embodiment, SAS 130 may be a highly automated frequency coordinator function that assigns frequencies in the 3.5 GHz band. SAS 130 may also authorize and manage use of the CBRS spectrum, protect higher tier operations from interference, and maximize frequency capacity for all CBRS operators. SAS 130 may, in certain embodiments, instruct CBSD 120 to stop radiating after a given time period. The time period may be defined in seconds, minutes, or any other time period. In other words, SAS 130 may define a drop period, after which CBSD 120 may terminate communication with UE 130 by shutting down the interface between CBSD 120 and UE 110. Terminating the communication between UE 130 and CBSD 120 may cause some or all of the communication between the UE 130 and the network to terminate or sever.

The terminating of the communication, in some embodiment, may be triggered by a higher licensee demanding use of the radio spectrum. For example, a GAA operator may be utilizing the 3.5 GHz spectrum. A PA licensee or an incumbent licensee may then attempt to use the 3.5 GHz spectrum, at which point the SAS triggers the termination of the communication between the CBSD 120 and UE 110, which may clear the 3.5 GHz spectrum from use by GAA operators. In certain embodiments, when the PA licensee and the incumbent licensee attempt to use the 3.5 GHz spectrum, the SAS may command the CBSDs that all CBRS frequencies be cleared.

In certain embodiments, CBRS may be used to offer any type of messaging or voice services, such as voice over LTE (VoLTE), between the network and UEs. Voice services may also include emergency call services, to police, firefighters, or other emergency service personnel. For example, in the United States, an emergency call service may be a 911 telephone call. Because the emergency service call may still be a function of the GAA operator, a higher priority tier, such as a PA licensee and an incumbent licensee, may have a higher priority than the emergency service call.

During an active or ongoing emergency call, in some embodiments the CBSD may receive an indication or an instruction from the SAS to shut down or terminate the interface to the UE, such as the Uu interface, after a determined period of time, known as a drop time or drop period. The CBSD, in certain embodiments, may then attempt to perform handover towards other nearby cells, if at all possible. When such handover may not be possible, however, and other fallback mechanisms are not available either, the CBSD may shut down the interface to the UE after the drop time. Once the interface to the UE is shut down, and communication between the UE and the network is terminated, the ongoing emergency call may be dropped.

Certain embodiments, therefore, may allow for a warning message, also known as a pre-revocation, pre-shutdown, or pre-termination message, to be transmitted to a network entity before communication between the network and the UE using the CBRS will be terminated. The warning message may include a drop time after which communication between the network and the UE may terminate. In other words, the warning may warn the network of imminent service termination or that the one or more radio bearers associated with the emergency call service will be released. After receiving the warning message, the network may either trigger the performance of an action or perform an action before the drop time. For example, the network may seek location information of the UE. The action may be related to the UE, which initiates the emergency call service, and/or to the public safety answering point (PSAP). The PSAP may be, for example, a police station. Because the user of the UE initiates the emergency call service, in some embodiments, the user of the UE may be referred to as a caller.

Figure 2:
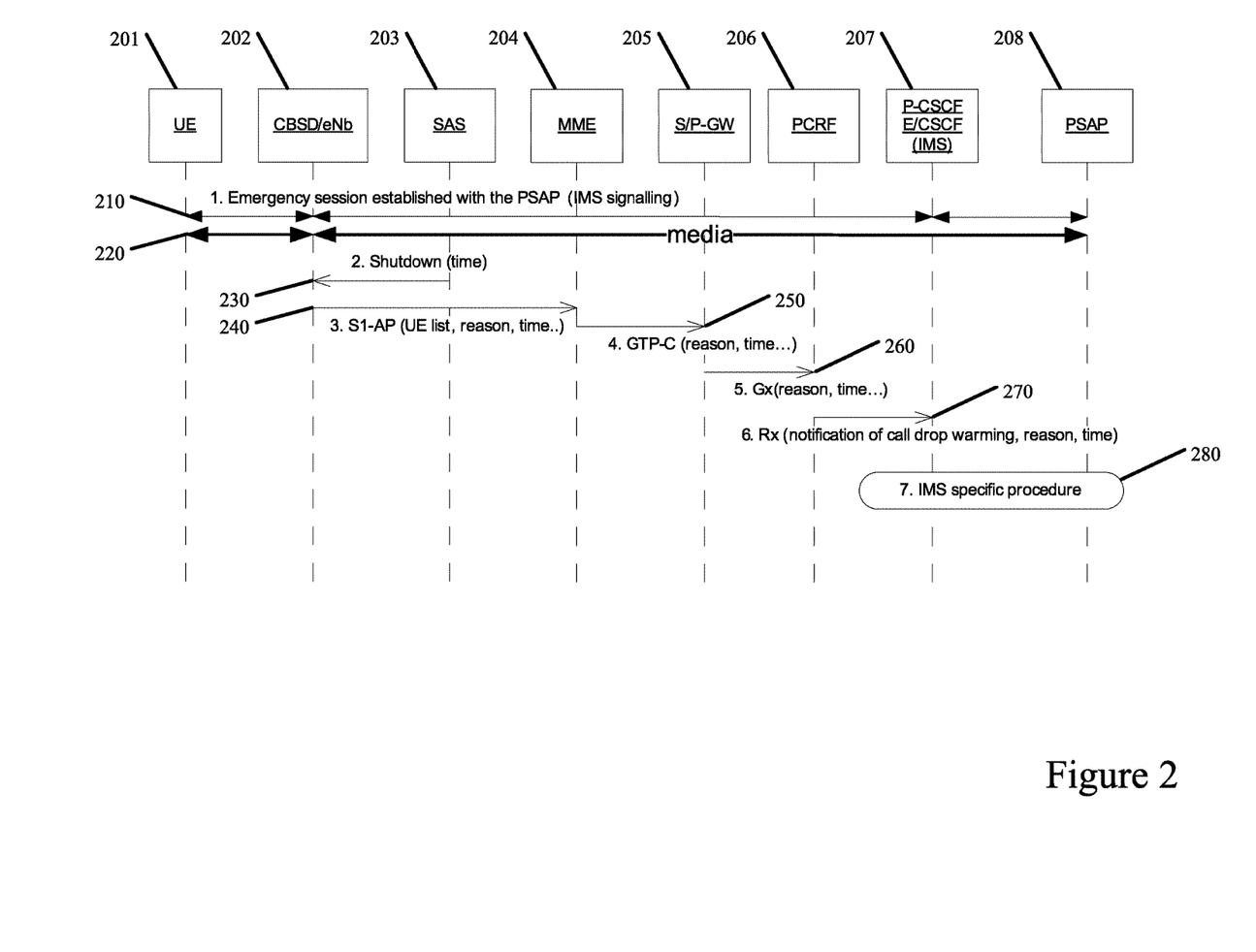
FIG. 2 illustrates an example of a signal flow diagram according to certain embodiments.

FIG. 2 illustrates an example of a signal flow diagram according to certain embodiment. In particular, FIG. 2 illustrates the use of a warning, pre-revocation, pre-shutdown, or pre-termination message before terminating communication between the UE and the network. In step 210, a UE 201 may establish an internet protocol multimedia subsystem (IMS) emergency session with PSAP 208 via at least CBSD/eNB 202 and P-CSCF or emergency call session control function (E/CSCF) 207. Further details regarding the evolved packet system (EPS) and IMS procedures for the establishment of emergency calls may be found in 3GPP TS 23.401 and 3GPP TS 23.167. 3GPP TS 23.401 and 3GPP TS 23.167 are hereby incorporated by referenced in their entirety.

Once the emergency session may be established, UE 201 and PSAP 208 may transmit media to one another, such as voice media, as shown as step 220. In step 230, SAS may transmit or send a command or an indication to CBSD 202. The command or indication may instruct CBSD 202 to stop radiating within a certain time period. This may include CBSD 202 terminating the interface between CBSD 202 and UE 201 after a drop time. The drop time may be determined by SAS 203 based on the type of licensee that may be attempting to use the CBRS. For example, the drop time may be in seconds or minutes. For example, the drop time may be dropped in 60 seconds or 2 minutes.

In certain embodiments, CBSD 202 may then determine that it may not be possible to move UE 201 to another channel, for example, without impacting a higher priority user. Handover of the emergency session to another channel may therefore not be possible, in some embodiments, leading to the termination of any ongoing emergency service calls.

In step 240, CBSD 202 may send an indication to MME 204 via an interface, such as an S1 interface, using, for example, an S1 Application Protocol (S1-AP). The indication may inform MME 204 that the radio bearers associated with the emergency call may be released or that the communication between CBSD 202 and UE 201 may be imminently terminated after a drop time.

In certain embodiments, UE context release request procedure may be used in step 240. The context release request procedure may include a cause value that includes the drop time determined by the SAS 203. The cause value may indicate to the MME 204 that the EPS radio bearer may be released by CBSD 202 after the drop time. In certain embodiments, upon receiving the indication from CBSD 202, MME 204 may start a wait timer before releasing the UE context. Once a duration of the wait timer expires, MME 204 may release the UE context, thereby terminating the connection between the UE and the network. The duration of the wait timer may depend on the drop time, and may in certain embodiments have the same value as the drop time.

In some other embodiments, an Evolved Universal Mobile Telecommunications System (UMTS) Terrestrial Radio Access (E-UTRAN) radio access bearer (E-RAB) modification procedure may be used. In an E-RAB modification procedure, CBSD 202 may give the list of relevant bearers to MME 204. For example, the list of relevant bearers may include one or more bearer identifiers for downlink user plane for all the EPS bearers associated with the emergency call. In certain embodiments, a cause value, which may include a drop time, may be added to the modification procedure and sent to MME 204. The cause value, including the drop time, may be added to an E-RAB modification indication message to tell MME 204 about the modification.

Other embodiments, on the other hand, may include a yet to be defined message, for example, a Radio Frequency (RF) unavailable indication. The message may have a list of S1-AP identifications of UEs that have an ongoing emergency session. The message can also include a drop time that includes a period of time after which CBSD 202 relinquished the RF or terminates communication between UE 201 and the network. In certain embodiments, the format of the message may be similar to the S1 reset message and/or the public warning system (PWS) restart indication message. The above messages transmitted from CBSD 202 to MME 204 may be referred to as a warning message.

In step 250, MME 204 may transmit a warning message, such as a general packet radio service (GPRS) tunneling protocol control (GTP-C) message to a serving gateway (S-GW) or a proxy gateway (P-GW) 205. GTP-C message, for example, may be a modify bearer request or command. The warning message may include the drop time and/or the reason for the pending CBRS termination. In certain embodiments, more than one warning message may be sent, with each warning message being associated with a UE. In step 260, PCRF 206 may receive the warning message originating at CBSD 202 via P-GW 205 through a gateway interface (Gx).

In step 270, PCRF 206 may send the warning message to a network application function, such as P-CSCF 207 or E/CSCF 208. The warning message may include a drop time after which communication between a network and UE 201 using the CBRS will terminate. The warning message, in certain embodiments, may also include the reason for the termination. For example, the reason may be that the PA licensee or the incumbent licensee is attempting to use CBRS.

In step 280, upon receiving the warning message P-CSCF 207 may trigger an action in the IMS. In certain embodiments, IP Multimedia Subsystem Application Server (IMS AS) as a back-to-back user agent (B2B UA) during the emergency setup procedure may allow for the network to perform the action. The network may perform the action while the emergency session is in progress, before the drop time indicated in the warning message. The action may be an IMS specific procedure, for example.

In certain embodiments, the action performed by the IMS network before the drop time may be an action that may increase and safety or health of the caller using the UE. For example, the action may be injecting a warning when the emergency call may be in progress. The injection of the warning may be used to inform the UE or the end user that the communication or connection between the UE and the network may terminate after the drop time. The end user may be a user of the UE. In certain embodiments, the action may be an audible warning in which the UE itself may not know about the warning, but the end user may hear the warning. The action may also be sending the last location of the UE to PSAP 208. In certain embodiments, the triggering of the last location of the UE may be done by a network entity, instead of PSAP 208.

In some other embodiments, the action may be to include the reason for the emergency call drop in a charging data record (CDR). The reason, for example, may be that the communication between the UE and the network may terminate after the drop time due to CBRS prioritization.

In other embodiments, the network may play an announcement and record the caller message. For example, the caller or the end user of the UE may be asked to record his address and to explain what the emergency may be. The statement of the caller or the end user may then be recorded and preserved by the network, even after the communication to the network may be terminated. In yet another embodiment, the action may be making the warning message available to emergency responders in real time or near real time. The message may be sent in a near real time due to the signaling limitations of the IMS network.

Although many of the above embodiments describe an emergency service call, certain embodiment may also be applicable to VoLTE calls as well, or any other type of voice call between the UE and another telephone device, such as a UE, a landline telephone, or any other device capable of voice communication. The warning message in such embodiments may be a message that merely informs the network that communication between the UEs may be imminent.

Figure 3:
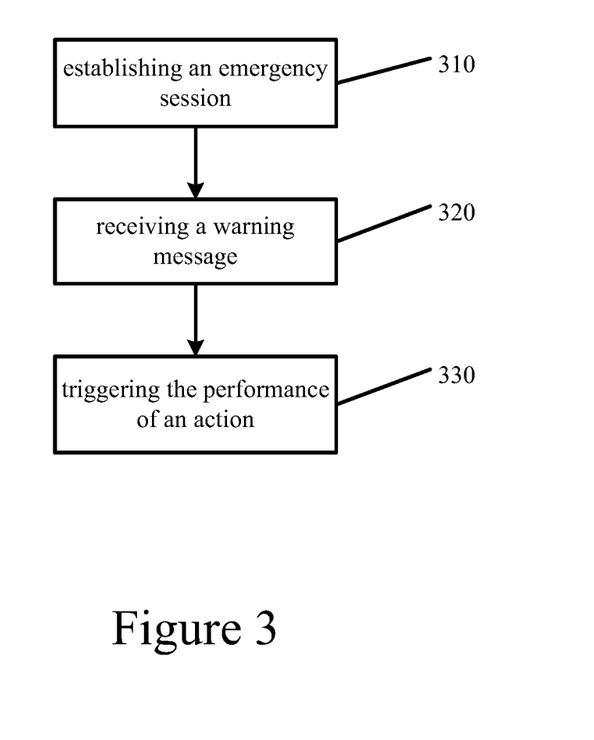
FIG. 3 illustrates an example of a method according to certain embodiments.

FIG. 3 illustrates an example of a method according to certain embodiments. In particular, FIG. 3 illustrates a method performed at a network entity, for example an MME, PCRF, or P-CSCF. In step 310, the network entity may establish an emergency session with the UE via the CBRS. The emergency session may be ongoing before the drop time. The emergency session may connect the UE to a PSAP. In step 320, the network entity may receive from a CBSD a warning message. The warning message may include a drop time after which communication between a network and a UE using the CBRS may terminate. The warning message may also include a reason for terminating communication between the network and the UE.

In step 330, the network entity may trigger the performing of an action based on the warning message by the network before the drop time. The action may be performed using the IMS signaling. The action may include at least one of seeking a last location of the user equipment, including a reason for the termination in a charging data record, playing an announcement to the end user or the user equipment, recording a caller message from an end user, and/or forwarding a message to an emergency responder.

Figure 4:
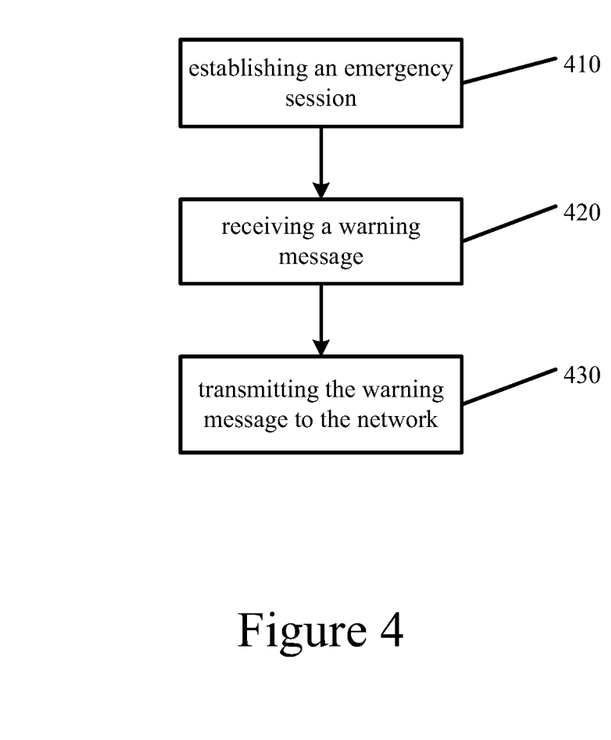
FIG. 4 illustrates an example of a method according to certain embodiments.

FIG. 4 illustrates an example of a method according to certain embodiments. In particular, FIG. 4 illustrates a method performed at a CBSD. In step 410, the CBSD may establish an emergency session between the network entity and the UE via the CBRS. The emergency service may be ongoing before the drop time. In step 420, CBSD may receive a warning message. The warning message may include a drop time after which communication between a UE and a network may terminate. The warning message may be received from a SAS, and the drop time may be determined by the SAS. The warning message may be triggered by the SAS to terminate access of the UE to the network via the CBRS in favor of higher priority usages, such as PA licensees or incumbent licensees. In step 430, the warning message may be transmitted from the CBSD to a network entity. The warning message may trigger an action by the network before the drop time based on the warning message.

Figure 5:
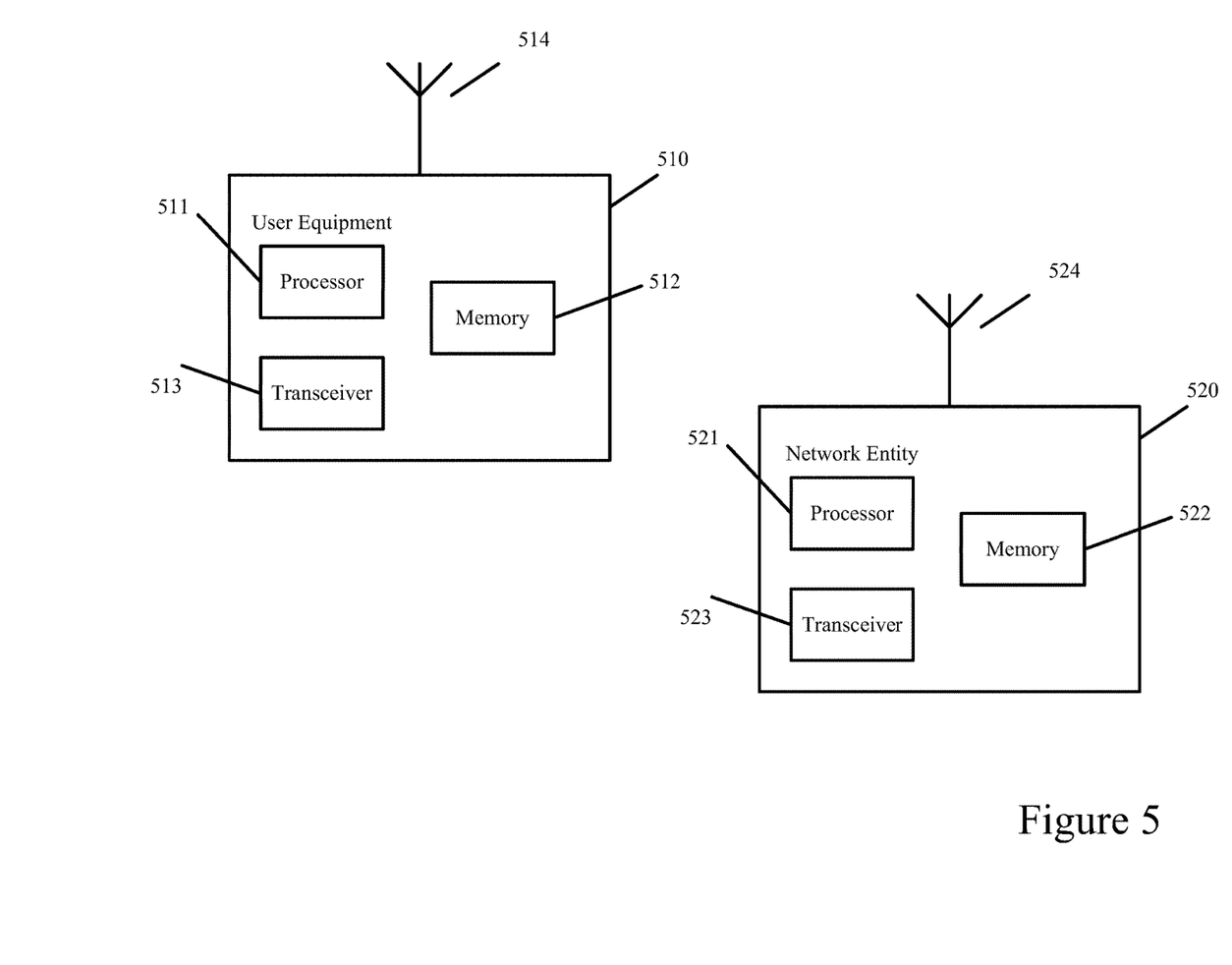
FIG. 5 illustrates a system according to certain embodiments.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, network entity 520 or UE 510. The system may include more than one UE 510 and more than one network entity 520. Network entity 520 may be a CBSD, a base station, an access point, an access node, an eNB, a server, a host, a MME, a S-GW, a P-GW, a PCRF, a P-CSCF, E/CSCF, or any other network entity that may communicate with the UE.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 510 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiments, an apparatus, such as a user equipment or a network node, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 5 illustrates a system including a network entity 520 and UE 510, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 510 may likewise be provided with a variety of configurations for communication other than communicating with network entity 520. For example, the UE 510 may be configured for device-to-device, machine-to-machine, or vehicle-to-vehicle communication.

The above embodiments provide for significant improvements to the functioning of a network and/or to the functioning of the network entities, within the network, as well as CBSDs or UEs communicating with the core network. Certain embodiments provide for a warning message sent to the network before the termination of the communication, for example an emergency service call, between the network and the UE. The network may then perform actions that can help to protect the safety and/or health of the caller or user of the UE before the communication is terminated.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied to any communication network or wireless system. While many of the above embodiments refer to LTE or LTE-A, other embodiments may be used for 3GPP fifth generation (5G) technology, fourth generation (4G) technology, New Radio (NR) technology, and/or any wireless land access network (WLAN) technology.

PARTIAL GLOSSARY

FCC Federal Communications Commission
3GPP Third Generation Partnership Project
LTE Long Term Evolution
LTE-A LTE Advanced
CBRS Citizens Broadband Radio Service
PA priority access
GAA general authorized access
SAS Spectrum Access System
CBSD citizens broadband radio service device
P-CSCF proxy call session control function
PCRF policy and charging rules function
IMS internet protocol multimedia subsystem
UE user equipment
eNodeB evolved NodeB
MME mobility management entity
EPC evolved packet core
VoLTE voice over LTE
PSAP public safety answering point
E/CSCF emergency call session control function
EPS evolved packet system
RF radio frequency
PWS public warning system
GPRS general packet radio service
S-GW serving gateway
P-GW proxy gateway
Gx gateway interface
CDR charging data record

We claim:

1. A method, comprising:
    receiving at a network entity from a citizens broadband radio service device a warning message, wherein the warning message includes a drop time after which communication between a network and a user equipment via the citizens broadband radio service will terminate; and
    triggering performance of an action based on the warning message by the network before the drop time.

2. The method according to claim 1, wherein the warning message comprises a radio frequency unavailable indication.

3. The method according to claim 1, further comprising:
    establishing an emergency session with the user equipment via the citizens broadband radio service, wherein the emergency session is ongoing before the drop time.

4. The method according to claim 3, wherein the emergency session connects the user equipment to a public safety answering point.

5. The method according to claim 1, wherein the network entity is a policy and charging rules function, a proxy call session control function, or a mobility management entity.

6. The method according to claim 1, wherein the warning message is received at a proxy call session control function from the citizens broadband radio service device through a policy and charging rules function.

7. The method according to claim 1, wherein the warning message comprises a reason for terminating communication between the network and the user equipment via the citizens broadband radio service.

8. The method according to claim 1, wherein the warning message is included in a user equipment context release request procedure or a radio bearer modification procedure.

9. The method according to claim 1, wherein the action is performed using internet protocol multimedia subsystem signaling.

10. The method according to claim 1, wherein the action comprises at least one of seeking a last location of the user equipment, including a reason for the termination in a charging data record, playing an announcement to an end user or the user equipment, recording a caller message from the end user, or forwarding a message to an emergency responder.

11. A method, comprising:
receiving at a citizens broadband radio service device a warning message, wherein the warning message includes a drop time after which communication between a user equipment and a network via the citizens broadband radio service will terminate; and
transmitting the warning message from the citizens broadband radio service device to a network entity, wherein the warning message triggers performance of an action by the network before the drop time based on the warning message.

12. The method according to claim 11, wherein the warning message comprises a radio frequency unavailable indication.

13. The method according to claim 11, further comprising:
receiving the warning message comprising the drop time from a spectrum access system.

14. The method according to claim 13, wherein the drop time is determined by the spectrum access system.

15. The method according to claim 13, wherein the warning message is triggered by the spectrum access system to terminate access of the user equipment to the network via the citizens broadband radio service in favor of higher priority usages.

16. The method according to claim 11, wherein the warning message comprises a reason for terminating communication between the network and the user equipment via the citizens broadband radio service.

17. The method according to claim 11, further comprising:
establishing an emergency session between the network entity and the user equipment via the citizens broadband radio service, wherein the emergency service is ongoing before the drop time.

18. The method according to claim 17, wherein the action is performed using internet protocol multimedia subsystem signaling.

19. The method according to claim 11, wherein the network entity is a policy and charging rules function, a proxy call session control function, or a mobility management entity.

20. The method according to claim 11, wherein the warning message is transmitted from the citizens broadband radio service device to a proxy call session control function through a policy and charging rules function.

21. The method according to claim 11, wherein the action comprises at least one of seeking a last location of the user equipment, including a reason for the termination in a charging data record, playing an announcement to an end user or the user equipment, recording a caller message from the end user, or forwarding a message to an emergency responder.

22. An apparatus, comprising:
at least one memory comprising computer program code;
at least one processor;
wherein the at least one memory and the computer program code are configured, with the at least one processor, to cause the apparatus at least to:
receive at a citizens broadband radio service device a warning message, wherein the warning message includes a drop time after which communication between a user equipment and a network via the citizens broadband radio service will terminate; and
transmit the warning message from the citizens broadband radio service device to a network entity, wherein the warning message triggers performance of an action by the network before the drop time based on the warning message.

* * * * *